Nov. 24, 1925.

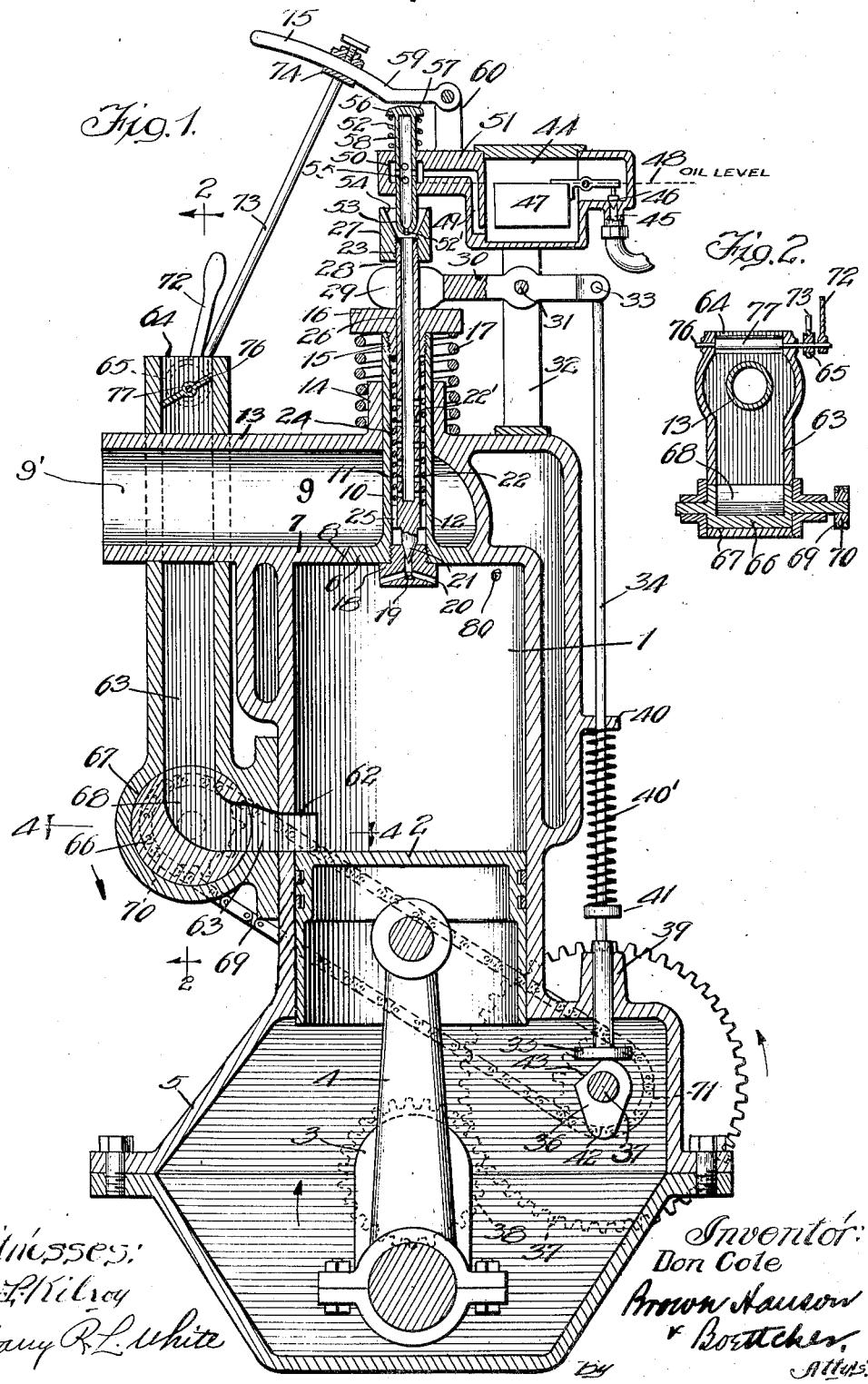

D. COLE 1,562,539

INTERNAL COMBUSTION ENGINE

Filed Sept. 9, 1918    2 Sheets-Sheet 2

Witnesses:
W. F. Kilroy
Harry R. L. White

Inventor:
Don Cole

Brown Hanson & Boucher,
By
Attys.

Patented Nov. 24, 1925.

1,562,539

UNITED STATES PATENT OFFICE.

DON COLE, OF CHICAGO, ILLINOIS, ASSIGNOR OF ONE-HALF TO JOHN A. DIENNER, OF CHICAGO, ILLINOIS.

INTERNAL-COMBUSTION ENGINE.

Application filed September 9, 1918. Serial No. 253,140.

*To all whom it may concern:*

Be it known that I, DON COLE, a citizen of the United States, residing at Chicago, in the county of Cook and State of Illinois, have invented a certain new and useful Improvement in Internal-Combustion Engines, of which the following is a full, clear, concise, and exact description, reference being had to the accompanying drawing, forming a part of this specification.

My invention relates to improvements in internal combustion engines and has to do particularly with the feeding of fuel and air to the cylinders of such engines.

As the quality of the gasoline continues to drop, it becomes more and more difficult to obtain efficient use thereof by means of the carbureting devices which have been so highly efficient with higher grade oils. Furthermore the rising cost of gasoline makes it more imperative to efficiently use lower grade fuels, such as kerosene and even the heavier oils.

The difficulties which appear to be inherent in the use of the lower grade oils in internal combustion engines are well known to those skilled in the art. It is also well known that if perfect vaporization can be obtained of the lower grade oils, a marked economy in fuel cost will result.

The heavier oils or fractions cannot be vaporized by spraying into the current of air taken into the engine, and the art has heretofore tried to vaporize them by heating before spraying, or vaporizing completely before injecting into the air intake. Such vaporization is unsatisfactory because it is not controlled by suction and further the extent of active surfaces for heating and for vapor releasing are too great to make the idea practical.

According to my invention the fuel is injected or sprayed in finely divided form into the cylinders of the engine upon the intake stroke of the engine. The air intake is at this time closed off so that the necessary air for supporting combustion is not permitted to enter, but instead, a partial vacuum of relatively high degree is caused. The reduction in pressure is preferably made in the neighborhood of 8 or 9 lbs. so that the absolute pressure within the cylinder is only about 6 or 7 lbs. The result is that the fuel is readily vaporized because of the reduced pressure and because of the hot cylinder walls. At or before the end of the suction stroke the air intake is opened and a sufficient quantity of air to support the combustion of the charge of fuel is permitted to enter.

Preferably the fuel is injected by an air atomizing device which operates by the difference in pressure between the outside atmosphere and the partial vacuum within the cylinder. Thus even at slow speed of the engine the injection pressure is always high, with the result that fuel is very finely and evenly atomized and injected into a region of reduced pressure so that the consequent reduction in boiling point may change these finely divided particles of liquid into vapor to secure a thorough even burning mixture within the engine.

I purposely supply the air component substantially in unheated condition, thus maintaining the oxygen content at its highest point, although a slight heating of the air to temper the same will not materially reduce the efficiency of the power production of the engine.

I have devised the internal combustion engine shown in the accompanying drawing as an illustration of a means for practically carrying out my improved method and also as an embodiment of my invention in so far as it relates to improvements in internal combustion engines.

In said drawing:

Figure 1 is a vertical central section of an internal combustion engine of the four cycle type which I have devised as best adapted with which to practice my invention;

Figure 2 is a vertical detail section on the line 2—2 of Figure 1;

Figure 3:
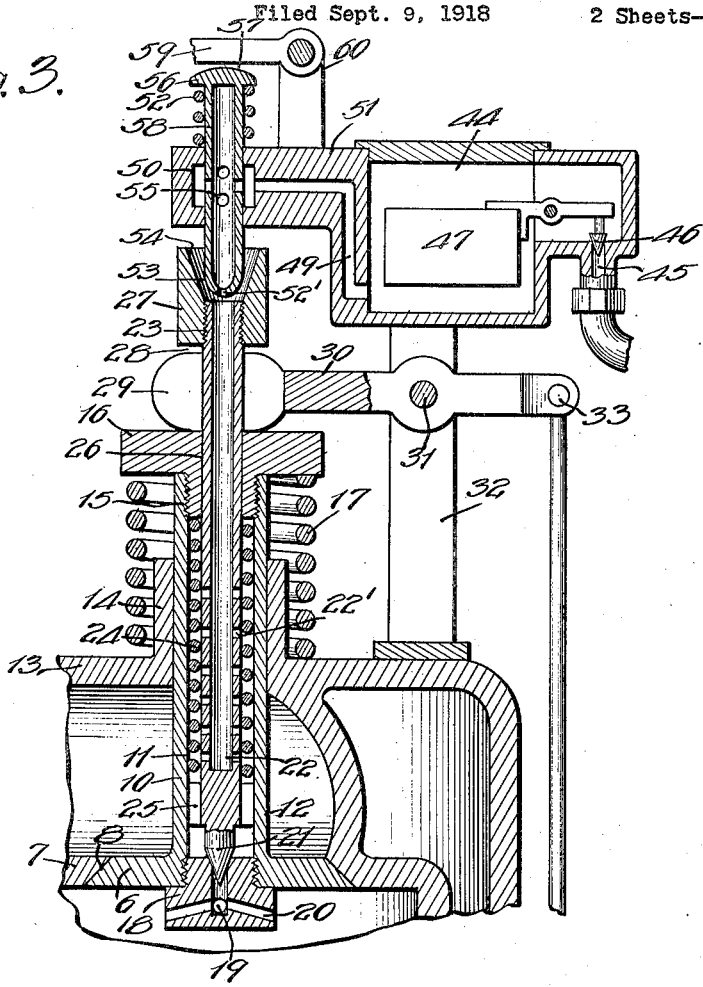
Figure 3 is an enlarged fragmentary vertical sectional view of the exhaust and fuel inlet valve mechanism.
Figure 4:
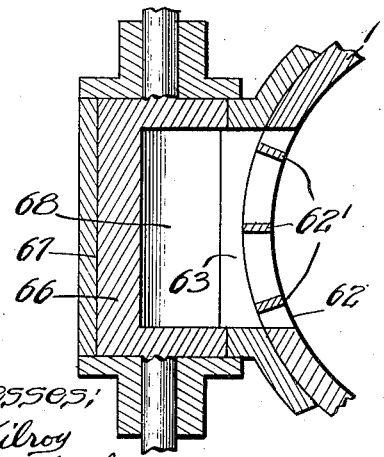
Figure 4 is a fragmentary horizontal section through the air inlet port on the line 4—4 of Figure 1.

In said drawing, the engine is shown as provided with the vertical cylinder 1 in which a piston 2 of ordinary construction reciprocates. The crank shaft 3 is operatively joined to the piston by the connecting rod 4. The crank shaft is mounted in suitable bearings in a crank case 5 from which the cylinder 1 rises.

An exhaust valve 6 of the poppet type is arranged in the upper cylinder head 7 and adapted to open inwardly so that the pressure within the cylinder will tend to hold the valve firmly upon the seat 8. An exhaust passage 9 is formed above the cylinder head 7 and the stem 10 of the valve extends thru this passage, the stem thereby being exposed to the hot exhaust gases. A horizontal exhaust pipe 9' carries the exhaust gases away from the engine.

The valve stem 10 is hollow and is provided with a central passageway 11 thru which the liquid fuel is fed to the cylinder. The wall 12 of the stem 10 is relatively thin so that the heat of the exhaust gases will be readily transmitted to the fuel and so that the valve may be kept cool. The stem 10 of the valve is extended thru the upper wall 13 of the exhaust passageway and thru a guiding boss 14. The upper end of the stem is closed by a screw plug 15 having a flanged head 16. A spring 17 is held between the head 16 and the top of the cylinder head to hold the exhaust valve upon its seat against the atmospheric pressure tending to push it open upon the suction stroke.

The lower end of the bore 11 of the hollow valve stem 10 is closed by a plug 18 which is screw threaded into the lower end thereof. This plug is preferably made of copper because of its high conductivity and to provide a suitable seat for the needle valve 21 which will be described later. This plug has a central port and radiating ports 20 communicating with the central port 19 so that liquid fuel passing thru the port 19 and being discharged from the radial ports 20 will be effectively sprayed into the various parts of the cylinder.

For controlling the flow of fuel through said passage 19 I provide a needle valve 21 having a stem 22 which extends up through the passage 11 and through the plug 15. This stem 22 is hollow and I provide its wall with holes 22' through which the fuel flows. The stem is open at its upper end 23 and closed at its lower end. The stem 22 is smaller in diameter than the passage 11 providing space for a compression spring 24 by which I normally hold the needle valve firmly to its seat in the plug 18. The spring must be of sufficient strength to maintain the valve closed against explosion pressures. This spring seats at its lower end upon wings or lateral projections 25 which I provide on the lower end of the needle valve stem 22 for guiding the needle valve accurately to its seat, and at its upper end against the inner end of the plug 15. The plug 15 is provided with a central opening 26 in which the stem 22 fits and is guided. For lifting the needle valve from its seat I provide a head 27 secured upon the upper end 23 of the valve stem and presenting a flat shoulder 28 opposed to the flange 16. Between the head 27 and the flange 16 I arrange one end 29 of a lever 30 which I pivotally mount between its ends on a pivot bearing 31 carried by suitable standards 32 rising from the cylinder head. The opposite end of the lever 30 is pivotally connected at 33 to the upper end of a cam rod 34 which extends down into the crank case and carries a plate 35 on its lower end for contact with a cam 36 carried by a cam shaft 37. The shaft 37 is geared to the crank shaft 3 by the 2-to-1 gears 37'—38 for revolution at half the speed of the engine shaft. The rod 34 is guided in a sleeve bearing 39 at its lower end and a guide bracket 40 between its ends. The bracket 40 serves as an abutment for a compression spring 40' on the lower end of the rod the lower end of the spring seating on a collar 41 fastened to the rod and by which the rod is maintained in contact with the cam 36. This spring 40' must be of sufficient tension to open the valve 21 against the tension of the spring 24.

The end 29 of the lever 30 has rounded upper and lower surfaces for contact with the lower end of the head 27 and the flange 16, respectively. The cam 36 has a rounded projection 42 which is effective to open the exhaust valve 6 in an obvious manner and is also cut away at one point 43 to permit the rod 34 to be pushed down by the spring 41 to open the needle feed valve 21 by means of the lever 30 and head 27.

To feed the fuel into the open upper end of the valve stem 22 I provide a constant level fuel oil supply chamber 44 supported on the standard 32. This chamber has an inlet 45 controlled by a needle valve 46 carried by a float 47, which arrangement is adapted to maintain the oil in the chamber 44 at the level of the dotted line 48. The inlet 45 is connected to a suitable oil supply, preferably to a supply tank (not shown) at a higher level so that the fuel will be supplied to the chamber 44 by gravity. Leading from the lower part of the chamber 44 I provide a feed passage 49 which I extend upwardly above the normal oil level and which connects with a chamber 50 in an arm 51 which extends outwardly from the body of the chamber. In the arm 51 and projected through the chamber 50 I mount a tubular member 52 in alignment with the needle valve stem 22 and immediately above the same. This tubular member constitutes a fuel feed tube and its lower end 53 is coned to act in the nature of a valve to regulate the flow of air into the upper end of the stem 22, and also to act in co-operation with the head 27, which I provide with a coned opening 54 into which the lower end of the feed tube projects, as an aspirator or injector to draw the fuel oil from the feed tube. The relative position of the nozzle 53 with respect to the conical opening 54 determines the degree of suction placed upon the port 52' of the nozzle 53, thereby controlling the quantity of fuel drawn per stroke from the reservoir 44.

I provide the wall of the feed tube 52 with holes 55 within the limits of the chamber 50 to permit the fuel oil to enter the feed tube 52, and I also provide the lower end of the feed tube with a small central fuel feed opening 52'. The upper end 56 of the tube 52 is closed and is provided with an annular flange 57 between which and the projection 51 I arrange a compression spring 58 to yieldingly hold the feed tube at the upper limit of its movement. The upward movement of the feed tube 52 is limited by a lever 59 which I pivot at one end upon a bracket 60 rising from the projection 51, the lever being adjustably held by connection to the throttle valve of the engine in the manner and for the purpose to be hereinafter more fully explained.

I arrange an air inlet port 62 for the cylinder at the lower end of the cylinder in position to be fully uncovered by the piston when at its lowest point, as shown in the drawing. The port 62 connects with an inlet passage 63 which I turn upward alongside the cylinder in the form of a flat tube and which ends above the upper end of the cylinder. I project the exhaust pipe 9' through the flat air inlet tube, the passage 63 surrounding the exhaust pipe, as best shown in Figure 2, so that in cold weather the air for combustion purposes shall be slightly heated or tempered before entering the cylinder. This passage is open at its upper end 64 for the inlet of air and I provide a butterfly throttle valve 65 in the upper end of the inlet passage to control the quantity of air flowing to the cylinder. To prevent the exhaust gases entering the inlet passage at times when the piston uncovers same, I provide a valve 66 controlling the passage and arrange to open and close same in proper time with the conditions within the cylinder.

While many other forms of valves could be devised for controlling this passage, I prefer to make this a rotary valve mounted within a suitable cylindrical enlargement 67 of the passage 63 and provided with a port 68, adapted, when the valve is in the position shown in the drawing to open the passage 63 and in other angular positions to obviously close said passage. To rotate the valve in time with the movement of the piston, I connect it by a chain 69 and equal diameter sprockets 70 and 71 to the cam shaft 37 so that the valve rotates in unison with the cam shaft, that is, at half the speed of the engine shaft.

I provide the throttle valve 65 with an operative lever 72 and I connect the throttle valve with the lever 59 for controlling the fuel oil feed and the supply of air simultaneously and in proper predetermined proportions.

I connect the lever 59 to the throttle valve by means of a link 73 which is provided at its upper end with a sliding block 74 fitting the end 75 of the arm 59 and adapted to be moved from and toward the feed tube to adjust the degree of variation of the oil feed relatively to the adjustment of the throttle valve. The block 74 is secured in its adjusted position by means of a set screw 76.

The end 75 of the lever 59 is curved, as shown, so that the adjustment of the block along the arm will not change the relative position of the feed tube 22 to the throttle valve. The throttle valve is rigidly mounted on a shaft 76' to which the operating arm 72 is also attached. I connect the lower end of the link 73 to the throttle valve shaft by an eccentric 77 which is fastened on the shaft an eccentric strap 78 which is fastened on the lower end of the link. I so place the eccentric on the throttle shaft that as the throttle valve is adjusted to decrease the volume of air entering the cylinder, the lever 59 is lowered thus depressing the feed tube against the tension of the spring 52 and this in turn limits the lifting of the needle valve 21 by the lever 30.

It should be noted that as the port 62 is relatively long circumferentially, I provide a member of spaced bridge bars 62' in the port to prevent the piston rings catching in the port as they pass same.

By means of an engine constructed as described I am enabled to accomplish the following:

The engine as mentioned is a four-cycle engine and, starting with the piston at the top of the cylinder at the beginning of the suction or intake stroke, the needle valve 21 in the exhaust valve starts to open by means of the cam rod 34 being pushed down by the spring 41. It should be understood that this spring 41 must be strong enough to overcome the needle valve spring 24. The rod is permitted to descend at this time because the flat spot 43 on the cam is beneath the rod. The needle valve is held open until just before the piston begins to uncover the air inlet port 62.

During the descent of the piston on its suction stroke, air in a limited quantity is being drawn in through the upper open end of the needle valve stem 22 and in being thus drawn it acts as an injector to draw fuel oil through the feed tube 52. The fuel oil is thus preliminarily mixed with a small proportion of air at this point and the mixture is heated by passage through the hollow stem of the exhaust valve before it enters the cylinder past the needle valve 21 and through the spray head 18. Also during this stroke of the piston as I do not permit any large quantity of air to enter the cylinder I produce a relatively great reduction of pressure of substantially 8 or 9 lbs. to the square inch.

The entering fuel is thus released into a partial vacuum which assists in the thorough atomization thereof. The quantity of fuel and air together which is in the cylinder up to the time the air inlet opens is so relatively small that a high degree of attenuation is reached, all of which assists in the thorough vaporization of the fuel and the thorough mixing of the air with the fuel once the air inlet opens.

The air inlet 62 is relatively large and when the piston in its descent finally uncovers it, the air rushes in with such great velocity, due to the low pressure, that it is immediately intermingled with the vaporized fuel and is completely and thoroughly mixed therewith, and is in proper condition for ignition. It is to be noted that the rotary valve is so arranged that at the time the piston uncovers the air inlet on the suction stroke, the port through the valve is open and remains open until the piston again closes the inlet passage on its return up stroke. As the piston rises on its compression stroke, the rotary valve slowly closes the passage to have it in closed condition when the piston again uncovers the air inlet on its power stroke.

Explosion takes place at or near the top center by means of a spark plug 80 and a timing device, not shown, and the piston travels down on the power stroke. About 5° before the piston uncovers the air inlet 62, the exhaust valve opens to relieve the pressure so that the rotary valve is not subjected to explosion pressure and the exhaust valve remains open until the piston again reaches the top center, thus completing the four cycles.

By means of the heating of the oil without heating the air, I am enabled to attain a maximum content of oxygen in the combustion mixture and thus increase the output of the engine above what I could obtain with heated air. Furthermore I am enabled to produce a relatively high vacuum in the cylinder to effect the vaporization and atomization of the fuel, and finally the substantially perfect mixture of the fuel and air in the cylinder.

By means of my construction the oil with a small proportion of air may be heated to a temperature sufficient to cause the vaporization thereof. The power and output of the engine may be controlled by controlling the air and fuel in definite proportions and to readily adjust such proportional ratio to suit different grades of oil.

As many modifications of my improved method and other embodiments of my improved engine will readily suggest themselves to those skilled in the art, I do not limit or confine my invention to the specific steps or structures herein disclosed.

I claim:

1. In a four-cycle internal combustion engine, a cylinder, a piston, a cylinder head closing one end of said cylinder, an exhaust valve at the head end of said cylinder, a fuel inlet adapted to admit fuel to the cylinder during the initial part of the suction stroke, an air inlet port at the other end of the piston stroke adapted to separately admit air to said cylinder during the latter part of the suction stroke, a continuously rotating valve controlling said air inlet port, a fuel passage in said exhaust valve, a fuel conduit individual to said fuel inlet and extending between said fuel inlet and the fuel passage in said exhaust valve, and means for jointly controlling the admission of fuel and air through said fuel inlet and through said air inlet port.

2. In a four-cycle internal combustion engine, a cylinder, a piston, a cylinder head closing one end of the cylinder, an exhaust valve at the head end of said cylinder, a fuel inlet adapted to admit fuel to the cylinder during the initial part of the suction stroke, an air inlet port adapted to admit air to said cylinder during the latter part of the suction stroke, a rotary valve controlling said air inlet port, means driven from the crank shaft of the engine for continuously rotating said valve, an air conduit for admitting air to said air inlet port through said rotary valve, said rotary valve positively controlling the main air admission to said cylinder uninfluenced by the suction therein, and a throttle valve in said air conduit.

3. In an internal combustion engine, a cylinder having a piston therein, a fuel inlet restricted to create a high degree of vacuum in said cylinder during the intake stroke and arranged to admit a relatively rich mixture into said vacuum for immediate vaporization thereby, a supplementary air inlet for admitting a supplementary charge of air substantially at the end of said intake stroke for producing a combustible mixture, said fuel inlet comprising a fuel admission port having a valve seat, a valve seating on said valve seat, and operating means driven from the engine crank shaft for raising said valve from said seat in a direction counter to the flow through said port whereby to avoid influencing of the operation of said valve by the vacuum in said cylinder.

4. In an internal combustion engine, a cylinder having an exhaust port communicating with an exhaust passage, an exhaust valve controlling said port and having a stem extending through said passage, said stem comprising a fuel inlet passage opening at one end to atmosphere and at the other end into said cylinder, a fuel valve controlling said fuel passage, said exhaust valve opening by movement in one direction and said fuel valve opening by movement in the opposite direction, and means for controlling said fuel valve whereby the opening of said valve during the suction stroke will induce a discharge of fuel through said fuel passage and into said cylinder under atmospheric pressure.

5. In an internal combustion engine, an exhaust valve having a hollow stem exposed to the exhaust gases, a source of fuel for feeding fuel into said hollow stem, a port in the end of said hollow stem for admitting the fuel into the engine cylinder, a valve controlling said port, and a fuel passage in said latter valve operating to place said port in suction communication with said source of fuel whereby to draw said fuel through said hollow stem and into the engine cylinder by induction.

6. In an internal combustion engine, an exhaust valve having a hollow stem exposed to the hot gases of combustion, a hollow stemmed needle valve within the exhaust valve stem for controlling the fuel feed to the engine, means for feeding fuel into said hollow needle valve and means for successively opening the exhaust valve and lifting said needle valve.

7. In a fuel feed for an internal combustion engine, an exhaust valve having a hollow stem exposed to the exhaust gases, a port at the inner end of the stem connecting the hollow stem with the cylinder of the engine, a fuel valve within the stem controlling said port, said fuel valve having a stem concentric with the exhaust valve stem and projecting beyond the outer end of the exhaust valve stem, and cam controlled means for alternately and positively opening said exhaust valve and said fuel valve.

8. In a fuel feed for internal combustion engines, a relatively small fuel feed inlet port for the cylinder, a hollow stemmed valve controlling said port, and having an open end, a fuel feed tube having an end in the path of the valve tube, and means for lifting said valve, and means controlling the position of said fuel feed tube with respect to the open end of the valve for controlling the proportions of the mixture.

9. In an internal combustion engine, a cylinder, a relatively small fuel inlet port therefore, a hollow stemmed valve controlling said port, said stem exposed to the exhaust gases, a fuel feed tube in alignment with said hollow stem and adapted to feed liquid fuel into the open end thereof, an air inlet port surrounding the end of the fuel feed tube, means for lifting the valve toward the tube to open the port into the cylinder and means for adjusting the tube relatively to the valve.

10. In an internal combustion engine having a cylinder, a piston reciprocable therein, a relatively small fuel inlet port at one end of the cylinder, a relatively large air inlet port at the opposite end of the cylinder, said air inlet adapted to be controlled by the piston, means for controlling the quantity of air admitted to the air inlet port and for simultaneously controlling the quantity of fuel fed to said fuel inlet port, and means for opening said fuel inlet port substantially at the beginning of the suction stroke.

11. In an internal combustion engine, a cylinder having a piston therein, a fuel inlet for admitting a relatively rich mixture of fuel and air during the intake stroke, a supplementary air inlet for admitting a supplementary charge of air substantially at the end of the intake stroke, and mechanism for regulating the speed of the engine comprising valve means for simutaneously controlling the volume of fuel and of air in said rich mixture and the volume of supplementary air admitted to said cylinder.

12. In an internal combustion engine, a cylinder having a piston therein, a fuel inlet for admitting a relatively rich mixture to said cylinder during the intake stroke, said fuel inlet being restricted to create a high degree of vacuum in said cylinder during said intake stroke, a supplementary air inlet for admitting a supplementary charge of air substantially at the end of said intake stroke for producing a combustible mixture, and manually operated control means for simultaneously controlling the volume of air in said rich mixture and the volume of supplementary air to said cylinder.

13. In an internal combustion engine of the four-cycle type including a cylinder and a piston reciprocable therein, a fuel inlet of a character adapted to introduce fuel and a quantity of air sufficient to pulverize the same as it passes into the cylinder, means for introducing a volume of air for combustion purposes at about the completion of the intake stroke of the piston, means for varying the volume of air used for combustion purposes, and means whereby the air flow varying means regulates the volume of flow of fuel first introduced.

14. In an internal combustion engine of the four-cycle type including a cylinder and piston operable therein, a fuel inlet adapted to introduce fuel and air in a highly pulverized state during substantially the entire intake stroke of the piston, a valve controlling the said fuel inlet, a spring for moving said valve in one direction, an air valve adapted to open the cylinder to a flow of air at atmospheric pressure at about the completion of the intake stroke of the piston, a throttle valve controlling the volume of flow of air, and means whereby the opening of the throttle valve varies the quantity of fuel supplied through said fuel inlet.

In witness whereof I hereunto subscribe my name this 5th day of September, A. D. 1918.

DON COLE.